(12) United States Patent
Kismarton

(10) Patent No.: US 7,748,119 B2
(45) Date of Patent: Jul. 6, 2010

(54) METHOD FOR MANUFACTURING COMPOSITE COMPONENTS

(75) Inventor: Max U. Kismarton, Renton, WA (US)

(73) Assignee: The Boeing Company, Chicago, IL (US)

( * ) Notice: Subject to any disclaimer, the term of this patent is extended or adjusted under 35 U.S.C. 154(b) by 1392 days.

(21) Appl. No.: 11/144,146

(22) Filed: Jun. 3, 2005

(65) Prior Publication Data

US 2006/0272143 A1 Dec. 7, 2006

(51) Int. Cl.
*B21D 53/88* (2006.01)
*B32B 9/02* (2006.01)

(52) U.S. Cl. ............... 29/897.2; 29/419.1; 29/464; 29/525.13; 428/615; 244/133; 269/289 R; 264/155; 409/219

(58) Field of Classification Search .......... 29/897, 29/897.2, 897.34, 419.1, 423, 464, 525.13, 29/281.1; 428/615, 297.4; 249/57; 244/2, 244/99.1, 133, 123.1; 269/289 R, 909; 264/155, 264/163; 409/219

See application file for complete search history.

(56) References Cited

U.S. PATENT DOCUMENTS

| | | | |
|---|---|---|---|
| 2,108,041 A | | 2/1938 | Colvin Jr. |
| 2,410,888 A | * | 11/1946 | Lucy .................. 264/219 |
| 2,563,218 A | * | 8/1951 | Darracott et al. ........ 244/123.1 |
| 3,266,130 A | | 8/1966 | Glaze |
| 3,381,484 A | | 5/1968 | Laughlin |
| 3,490,983 A | | 1/1970 | Lee |
| 3,768,760 A | | 10/1973 | Jensen |
| 3,975,916 A | | 8/1976 | Watson |
| 3,983,900 A | | 10/1976 | Airhart |
| 4,084,029 A | | 4/1978 | Johnson et al. |
| 4,098,559 A | | 7/1978 | Price |
| 4,198,018 A | | 4/1980 | Brault |
| 4,207,778 A | | 6/1980 | Hatch |
| 4,232,844 A | | 11/1980 | Sobey |
| 4,310,132 A | | 1/1982 | Robinson et al. |
| 4,368,234 A | | 1/1983 | Palmer et al. |
| 4,413,110 A | | 11/1983 | Kavesh et al. |
| 4,627,791 A | | 12/1986 | Marshall |
| 4,712,533 A | | 12/1987 | Cruise |

(Continued)

FOREIGN PATENT DOCUMENTS

DE 202004007601 U1 12/2004

(Continued)

OTHER PUBLICATIONS

Gay, "Materiaux Composites," Hermes, Paris, 4th edition, 1997, pp. 107-109.

(Continued)

*Primary Examiner*—Jermie E Cozart

(57) ABSTRACT

Methods and systems for manufacturing composite components, including asymmetric composite components, are disclosed. In one embodiment, a method of forming a composite component includes providing a forming tool having a base portion and at least one retaining portion; forming an uncured composite component on the forming tool; curing the composite component; performing a manufacturing operation on the cured composite component engaged with the forming tool; and after performing the manufacturing operation on the cured composite component, removing the cured composite component from the forming tool. In further embodiments, the forming tool may have a plurality of reference apertures disposed therethrough for performing drilling operations on the cured composite component.

10 Claims, 5 Drawing Sheets

U.S. PATENT DOCUMENTS

| | | | |
|---|---|---|---|
| 4,734,146 A | 3/1988 | Halcomb et al. | |
| 4,741,943 A | 5/1988 | Hunt | |
| 4,808,461 A | 2/1989 | Boyce et al. | |
| 4,966,802 A | 10/1990 | Hertzberg | |
| 5,096,772 A | 3/1992 | Snyder | |
| 5,154,370 A | 10/1992 | Cox et al. | |
| 5,164,255 A | 11/1992 | Weeks | |
| 5,269,657 A | 12/1993 | Garfinkle | |
| 5,306,557 A | 4/1994 | Madison | |
| 5,333,568 A | 8/1994 | Meldner et al. | |
| 5,362,345 A | 11/1994 | Stettler et al. | |
| 5,429,066 A | 7/1995 | Lewit et al. | |
| 5,476,704 A | 12/1995 | Kohler | |
| 5,538,781 A | 7/1996 | Rao et al. | |
| 5,632,940 A | 5/1997 | Whatley | |
| 5,669,999 A | 9/1997 | Anderegg et al. | |
| 5,746,553 A * | 5/1998 | Engwall | 409/132 |
| 5,766,724 A | 6/1998 | Tailor et al. | |
| 5,833,786 A | 11/1998 | McCarville et al. | |
| 5,958,550 A | 9/1999 | Childress | |
| 5,972,524 A | 10/1999 | Childress | |
| 6,012,883 A * | 1/2000 | Engwall et al. | 409/132 |
| 6,024,325 A | 2/2000 | Carter, Jr. | |
| 6,037,060 A | 3/2000 | Blohowiak et al. | |
| 6,114,050 A | 9/2000 | Westre et al. | |
| H1872 H | 10/2000 | Bowman | |
| 6,168,358 B1 * | 1/2001 | Engwall et al. | 409/219 |
| 6,277,463 B1 | 8/2001 | Hamilton et al. | |
| 6,306,239 B1 | 10/2001 | Breuer et al. | |
| 6,320,118 B1 | 11/2001 | Pridham et al. | |
| 6,355,584 B1 | 3/2002 | Corrons | |
| 6,405,978 B1 | 6/2002 | Dean et al. | |
| 6,436,507 B1 | 8/2002 | Pannell | |
| 6,554,225 B1 | 4/2003 | Anast et al. | |
| 6,565,944 B1 | 5/2003 | Hartness et al. | |
| 6,641,693 B2 | 11/2003 | Guckert et al. | |
| 6,641,893 B1 | 11/2003 | Suresh et al. | |
| 6,655,633 B1 | 12/2003 | Chapman, Jr. | |
| 6,703,118 B2 | 3/2004 | van Weperen et al. | |
| 6,729,792 B2 | 5/2004 | Pritzer | |
| 6,776,371 B2 * | 8/2004 | Tanaka et al. | 244/117 R |
| 6,779,830 B2 | 8/2004 | Patberg et al. | |
| 6,835,341 B2 | 12/2004 | Noda et al. | |
| 6,914,021 B2 | 7/2005 | Sidwell | |
| 7,141,191 B2 * | 11/2006 | Engwall et al. | 264/40.1 |
| 2003/0148082 A1 | 8/2003 | Bompard et al. | |
| 2003/0189131 A1 | 10/2003 | Cloud et al. | |
| 2004/0213952 A1 | 10/2004 | Takemura et al. | |
| 2004/0217497 A1 * | 11/2004 | Engwall et al. | 264/40.1 |
| 2005/0153098 A1 | 7/2005 | Bhatnagar et al. | |
| 2006/0237588 A1 | 10/2006 | Kismarton | |

FOREIGN PATENT DOCUMENTS

| | | |
|---|---|---|
| EP | 0433686 A1 | 6/1991 |
| EP | 1174533 A1 | 1/2002 |
| EP | 1336469 A1 | 8/2003 |
| EP | 1762666 A1 | 3/2007 |
| FR | 2660892 | 10/1991 |
| GB | 2238977 A | 6/1991 |
| JP | 2003066968 | 3/2003 |
| WO | WO9640551 | 12/1996 |
| WO | WO0216197 A1 | 2/2002 |
| WO | WO0216784 A2 | 2/2002 |

OTHER PUBLICATIONS

Garfinkle et al., "Aerospace: Smart Spars, Intrinsically-Smart Composite Structures", Fiber Architects, High Performance Textile Consultants, http://fiberarchitects.com/aerospace/spar.html, pp. 1-8, Jan. 1999.

* cited by examiner

METHOD FOR MANUFACTURING COMPOSITE COMPONENTS

FIELD OF THE INVENTION

This invention relates to composite materials, and more specifically, to methods and systems for manufacturing composite components, including fuselages for aircraft that include asymmetric composites.

BACKGROUND OF THE INVENTION

Composite components are being utilized in a wide variety of articles of manufacture due to their high strength and light weight. This is particularly true in the field of aircraft manufacturing. Typical materials used in the manufacture of composite components include glass or graphite fibers that are embedded in resins, such as phenolic, epoxy, and bismaleimide resins. The fiber and resin materials may be formed into a desired shape using a variety of different manufacturing systems and processes, and may then be cured (e.g. under elevated pressure and temperature conditions) to produce the desired component.

It will be appreciated that a variety of prior art apparatus and methods exist for forming composite components. Conventional methods of forming composite components include those methods generally disclosed, for example, in U.S. Pat. Nos. 6,702,964 B2 and 6,458,451 B1 issued to Steidl et al., U.S. Pat. No. 6,565,690 B1 issued to Pancorbo et al., U.S. Pat. No. 6,245,275 B1 issued to Holsinger, U.S. Pat. No. 6,030,575 issued to Barron et al., U.S. Pat. No. 5,817,269 issued to Younie et al., U.S. Pat. No. 5,902,535 issued to Burgess et al, U.S. Pat. No. 5,292,475 issued to Mead et al., U.S. Pat. No. 5,286,438 issued to Dublinski et al., and U.S. Pat. No. 5,152,949 issued to Leoni et al., which patents are incorporated herein by reference.

Although desirable results have been achieved using such prior art systems, there is room for improvement. For example, after composite components are formed it may be difficult to perform manufacturing operations on the composite components, such as drilling holes for installation of fasteners. The proper measuring, securing, and performance of manufacturing operations on composite components may therefore be time and labor intensive. This may be particularly true when working with asymmetric composite components, which tend to warp and distort from their desired positions during handling. Accordingly, methods and systems which at least partially reduce the time, labor, and expense associated with manufacturing composite components would have utility.

SUMMARY OF THE INVENTION

The present invention is directed to methods and systems for manufacturing composite components, including fuselages for aircraft that include asymmetric composites. Embodiments of apparatus and methods in accordance with the present invention may advantageously improve the accuracy of manufacturing operations on composite components, and may greatly reduce the time and expense associated with performing manufacturing operations on cured composite components, in comparison with the prior art.

In one embodiment, a method of forming a composite component includes providing a forming tool having a base portion and at least one retaining portion; forming an uncured composite component on the forming tool; curing the composite component; performing a manufacturing operation on the cured composite component engaged with the forming tool; and after performing the manufacturing operation on the cured composite component, removing the cured composite component from the forming tool. In further embodiments, providing a forming tool includes providing a forming tool having a plurality of reference apertures disposed through the base and retaining portions, forming an uncured composite component on the forming tool includes forming an asymmetric composite component on the forming tool, and performing a manufacturing operation on the cured composite component includes performing a plurality of drilling operations through the plurality of reference apertures to form a plurality of attachment apertures in the cured asymmetric composite component.

BRIEF DESCRIPTION OF THE DRAWINGS

Preferred and alternate embodiments of the present invention are described in detail below with reference to the following drawings.

DETAILED DESCRIPTION

The present invention relates to methods and systems for manufacturing composite components, including fuselages for aircraft that include asymmetric composites. Many specific details of certain embodiments of the invention are set forth in the following description and in FIGS. 1-8 to provide a thorough understanding of such embodiments. The present invention may have additional embodiments, or may be practiced without one or more of the details described for any particular described embodiment.

Figure 1:
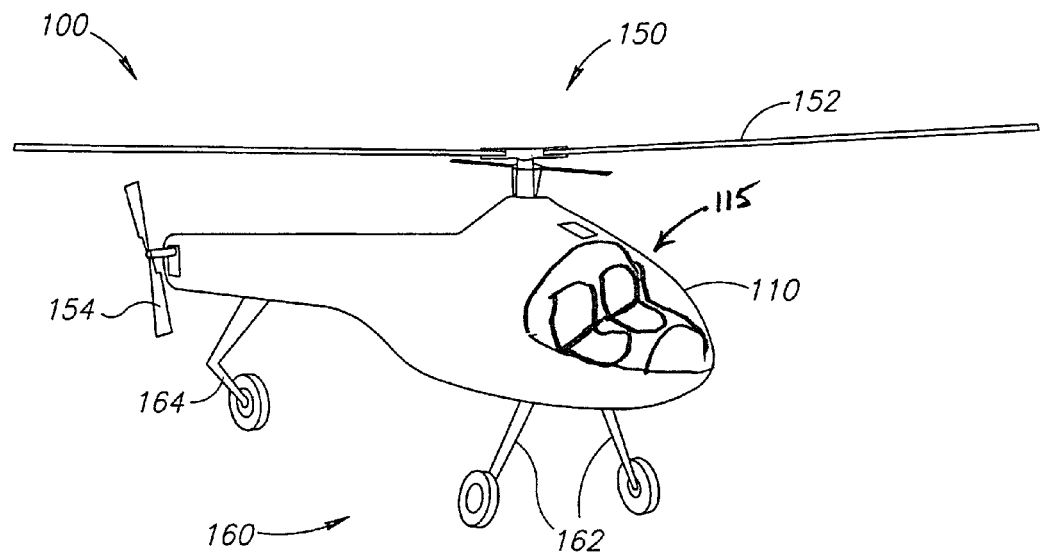
FIG. 1 is an isometric view of an aircraft having a fuselage in accordance with an embodiment of the invention.

FIG. 1 is an isometric view of an aircraft 100 in accordance with an embodiment of the invention. In this embodiment, the aircraft 100 includes a fuselage 110 and a propulsion system 150. A landing assembly 160 projects outwardly from the fuselage 110 and includes a pair of main landing gear 162 and a nose landing gear 164. In one particular embodiment, the aircraft 100 may be any type of air vehicle or assembly that includes composite components, such as helicopters, and manned or unmanned aircraft. For example, as shown in FIG. 1, the aircraft 100 may include a cockpit 115 disposed in a forward portion of the fuselage for manned operations. In alternate embodiments, however, the cockpit 115 may be eliminated.

Figure 2:
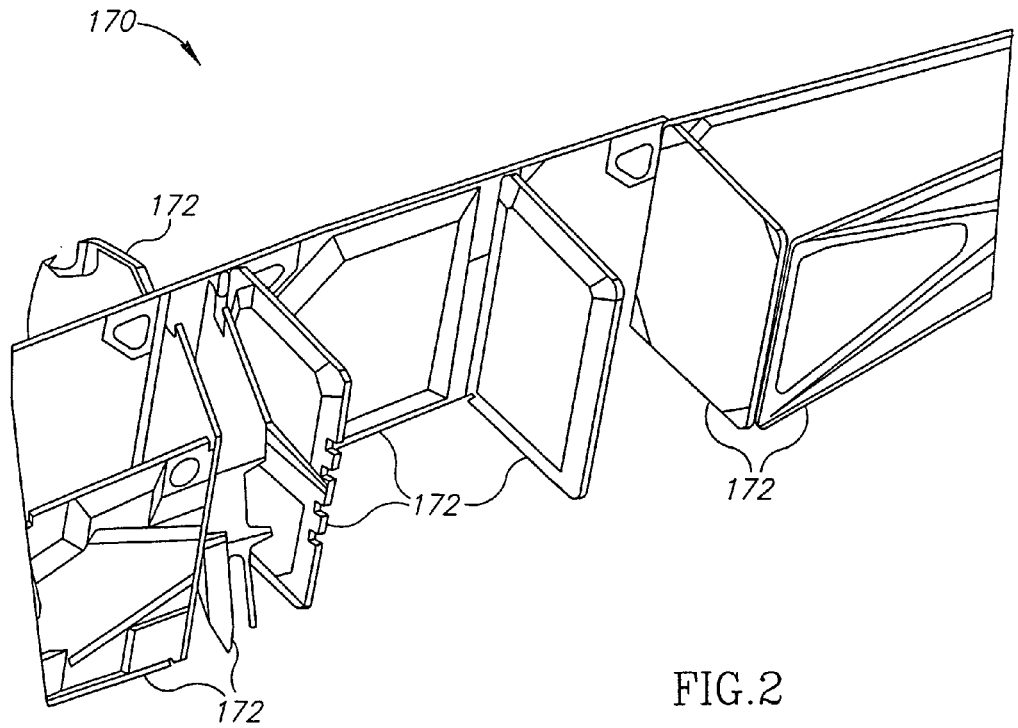
FIG. 2 is an enlarged, partial isometric view of a frame assembly of the aircraft of FIG. 1.

FIG. 2 is an enlarged, partial isometric view of a frame assembly 170 of the aircraft 100 of FIG. 1. In this embodiment, the frame assembly 170 includes a plurality of relatively-rigid members 172 that provide the primary load-bearing structural components of the aircraft 100. The relatively-rigid members 172 may be formed of any suitable materials, including metals, polymers, composites, or any other desired materials.

Figure 3:
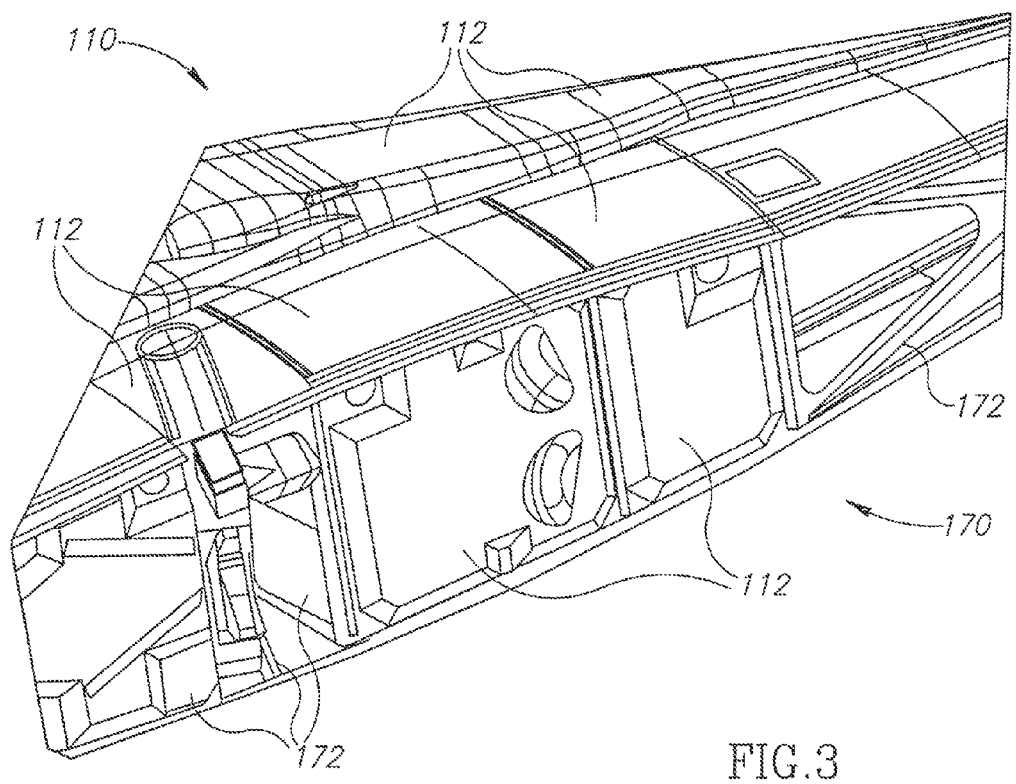
FIG. 3 is an enlarged, partial isometric view of a portion of a fuselage of the aircraft of FIG. 1.

FIG. 3 is an enlarged, partial isometric view of a portion of the fuselage 110 of the aircraft 100 of FIG. 1. In this embodiment, the fuselage 110 includes a plurality of fuselage components 112 that are coupled to the frame assembly 170. In one embodiment, at least some of the fuselage components 112 are formed of composite materials. More specifically, in one particular embodiment, at least some of the fuselage components 112 include an asymmetric composite material.

Figure 4:
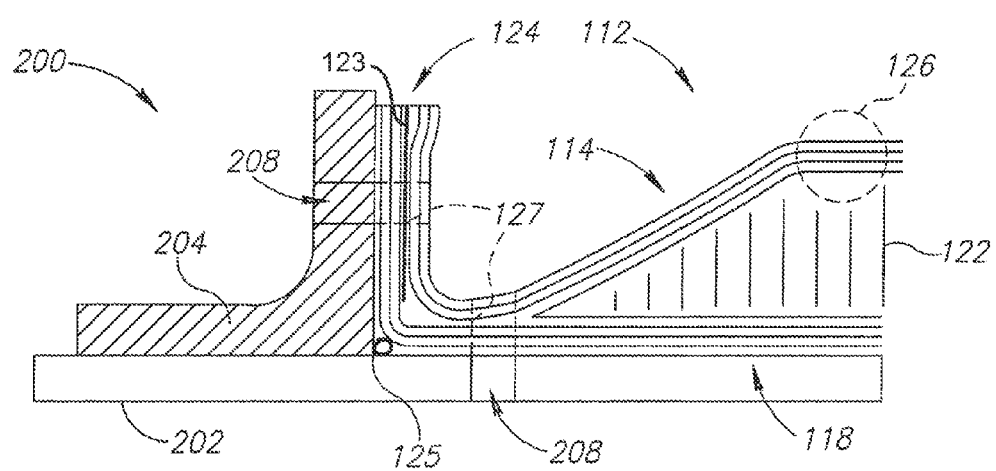
FIG. 4 is a side cross-sectional view of a portion of a fuselage component engaged with a forming tool in accordance with an embodiment of the invention.

FIG. 4 is a side cross-sectional view of a portion of a composite fuselage component 112 engaged with a forming tool 200 in accordance with an embodiment of the invention. In this embodiment, the composite fuselage component 112 includes a first (or upper) layered portion 114 and a second (or lower) layered portion 118, and an intermediate member 122 (e.g. honeycomb) formed between the first and second layered portions 114, 118. The first and second layered portions 114, 118 form an upwardly extending lip portion 124.

Figure 5:
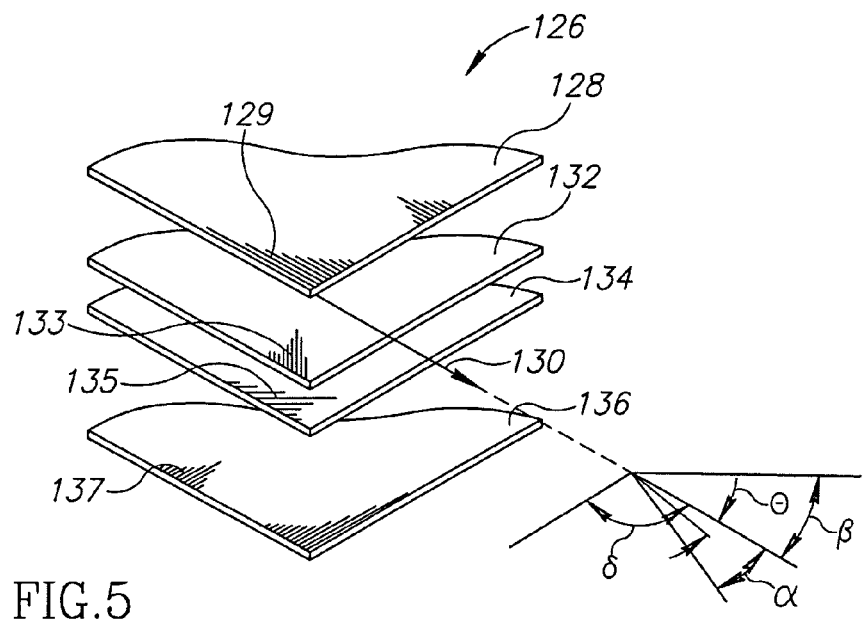
FIG. 5 is an enlarged, partially-exploded isometric view of a section of one of the composite fuselage component of FIG. 4.

As noted above, the composite fuselage component 112 may include an asymmetric composite material. For example, FIG. 5 is an enlarged, partially-exploded isometric view of a composite section 126 of one of the first and second layered portions 114, 118 of FIG. 4. In this embodiment, the composite section 126 includes a first composite layer 128 having a plurality of first fibers 129 disposed therein and oriented at a first angle θ with respect to a reference axis 130. The composite section 126 further includes a second composite layer 132 having a plurality of second fibers 133 oriented at a second angle α with respect to the reference axis 130, a third composite layer 134 having a plurality of third fibers 135 oriented at a third angle β with respect to the reference axis 130, in the fourth composite layer 136 having a plurality of fourth fibers 137 oriented at a fourth angle δ with respect to the reference axis 130. In one particular embodiment, the first angle θ is approximately zero degrees so that the first fibers 129 are approximately parallel with the reference axis 130. Similarly, in one particular embodiment, the second angle α is approximately 45°, the third angle β is approximately −45°, and the fourth angle δ is approximately 90°.

It will be appreciated that a variety of alternate embodiments can be conceived, and that the composite section 126 is not limited to the particular embodiment shown in FIG. 5. For example, in alternate embodiments, the composite section 126 may have a greater or fewer number of composite layers than are shown in FIG. 5. For example, while the composite section 126 in FIG. 5 includes a total of four composite layers oriented in an asymmetric manner, in alternate embodiments, additional composite layers may be added either asymmetrically or symmetrically, with the result that the composite section 126 may be a symmetric or an asymmetric section.

Furthermore, the reinforcing fibers in the layers composite component may be oriented in any desired manner, and are not limited to the particular angular values described above and shown in FIG. 5. Additional angular values, and additional design details of the structure and composition of further possible embodiments of the composite section 126, are described more fully in co-pending, commonly-owned U.S. patent application Ser. No. 11/118,594 entitled "Composite Skin and Stringer Structure and Method for Forming the Same," which is still pending; U.S. patent application Ser. No. 11/096,743 entitled "Composite Structural Members and Methods for Forming the Same," which has been allowed; U.S. patent application Ser. No. 11/096,796 entitled "Hybrid Fiberglass Composite Structures and Methods of Forming the Same," which is still pending; U.S. patent application Ser. No. 11/096,727 entitled "Multi-Axial Laminate Composite Structures and Methods of Forming the Same," which has been abandoned and U.S. patent application Ser. No. 11/096, 795 entitled "Composite Structural Member Having an Undulating Web and Method for Forming the Same," which is still pending and; which applications are incorporated herein by reference. As described more fully in these pending applications, the angles θ, α, β, δ of the fibers 129, 133, 135, 137 within the various layers 128, 132, 134, 136 may vary from zero to 90 degrees, inclusive. In specific embodiments, for example, the reinforcing fibers within the layers may be oriented with respect to the reference axis 130 at angles of 0 degrees, ±5 degrees, ±30 degrees, ±45 degrees, ±60 degrees, ±65 degrees, 90 degrees, or any other desired angular values.

Figure 6:
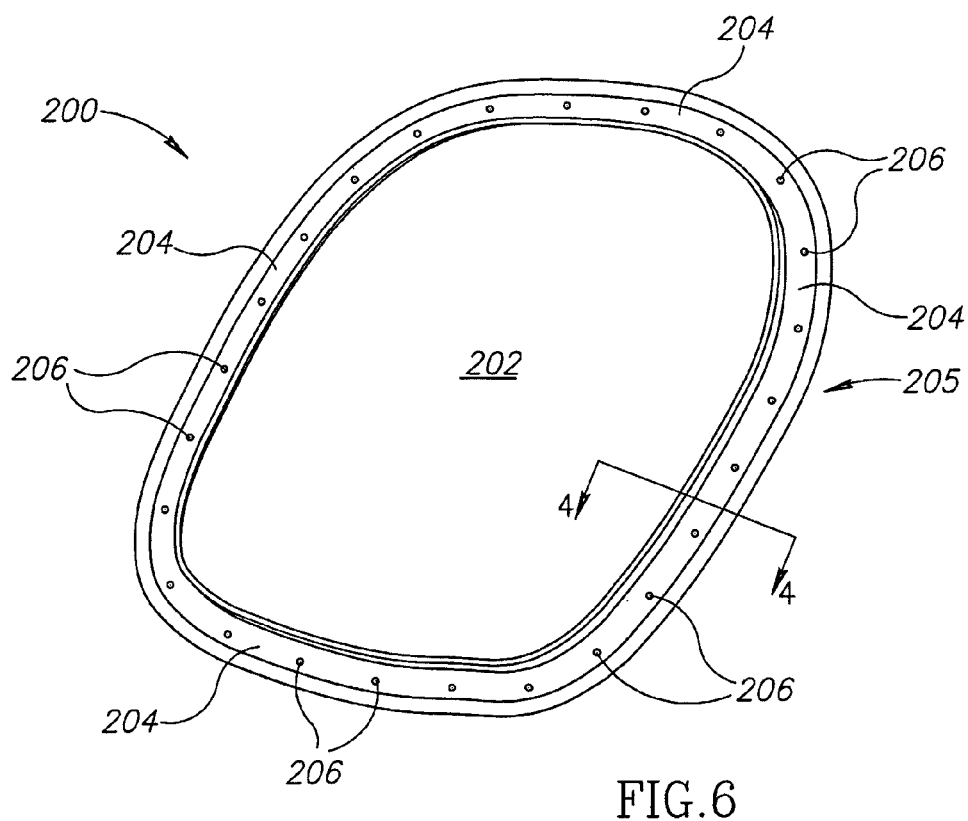
FIG. 6 is an isometric view of the forming tool of FIG. 4.

FIG. 6 is an isometric view of the forming tool 200 of FIG. 4. As shown in FIGS. 4 and 6, in this embodiment, the forming tool 200 includes a base portion 202 that supports the composite fuselage component 112, and a plurality of upwardly-extending retaining members 204 extending upwardly from the base portion 202. In the particular embodiment shown in FIG. 6, the plurality of arcuate retaining members 204 are distributed on the base portion 202, and form an enclosed retaining ring assembly 205 on the base portion 202. The plurality of retaining members 204 are removably coupled to the base portion 202 in any suitable manner, including, for example, by a plurality of fasteners 206 (FIG. 6). As shown in FIG. 4, a plurality of reference apertures 208 are formed in one or both of the base portion 202 or the retaining members 204. A securing bead 125 of a resinous material may be formed along an interface between the base portion 202 and the retaining members 204.

The operation of the forming tool 200 will now be described with reference to FIG. 7, which shows a method 300 of forming a composite component in accordance with an embodiment of the invention. In this embodiment, the method 300 includes providing a forming tool with the retaining members coupled to the base portion at a block 302. A bead of a resinous material may be formed along an interface between the retaining members and the base portion of the forming tool at a block 304. At a block 306, an uncured composite component is formed within the forming tool. For example, with reference to FIG. 4, the composite fuselage component 212 may be formed within the forming tool 200 by laying up the uncured lower layered portion 118 (e.g. in a prepreg condition) over the base portion 202 and the retaining members 204, positioning the intermediate member 122 on the lower layered portion 118, and laying up the uncured upper layered portion 116 over the uncured lower layered portion 118 and the intermediate member 122. As described above, the composite component may be an asymmetric or a symmetric composite component.

The method 300 further includes curing the composite component within the forming tool at a block 308. The curing of the composite component may be performed in any suitable manner, including any known or conventional composite curing process, such as, for example, the curing processes described in those issued patents and pending patent applications incorporated by reference above. More specifically, curing may include applying at least one of an elevated temperature and an elevated pressure to the composite component. Of course, the forming tool is adapted to endure the curing environment and to maintain the composite component in a desired shape throughout the curing process.

At a block 310, a manufacturing operation is performed on the cured composite component before it is removed from the forming tool. For example, in one embodiment, one or more drilling operations may be performed on the cured composite component using the plurality of reference apertures 208 formed in one or both of the base portion 202 and the retaining members 204 (FIG. 4) in order to form a plurality of attachment apertures 127 within the composite component 212. In alternate embodiments, other desired manufacturing operations may be performed, including, for example, riveting, sanding, welding, attaching, milling, deburring, etching, coating, or any other desired manufacturing operation. During the manufacturing operation (block 310), the cured composite component is securely held by the retaining members of the forming tool. Thus, the forming tool is adapted to maintain the composite component in a desired shape throughout the manufacturing process. For those embodiments having the bead of resinous material 125 (FIG. 4), the resinous material 125 may further secure the composite component into engagement with the forming tool during the manufacturing operation.

Figure 7:
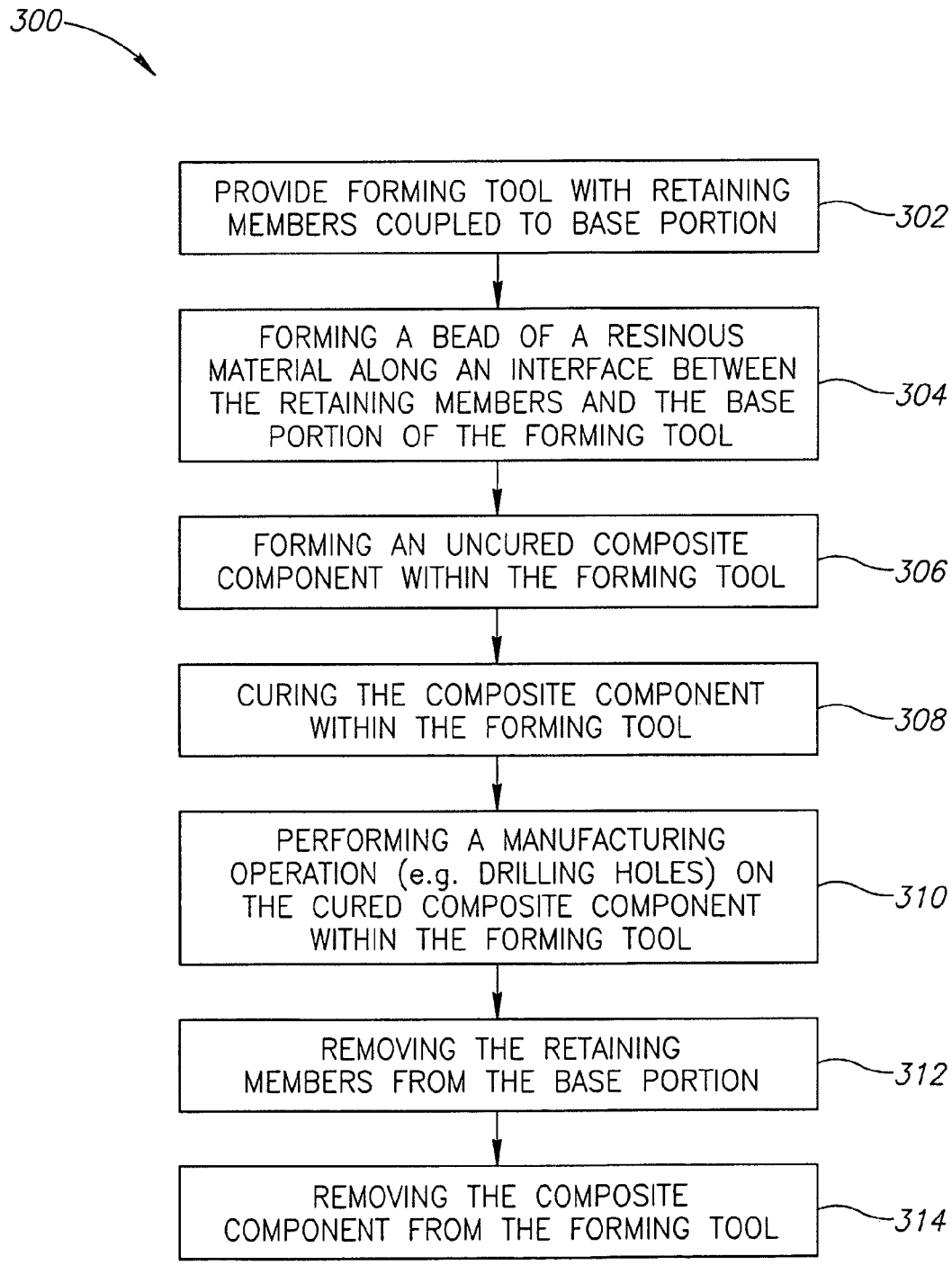
FIG. 7 is a flow chart of a method of forming a composite component in accordance with an embodiment of the invention.

With continued reference to FIG. 7, the retaining members may be removed from the base portion at block 312, and the cured composite component may be removed from the forming tool at a block 314. The removal of the cured composite component from the forming tool at block 314 may include, for example, detaching the cured composite component from the bead of resinous material 125. The composite component may then be used in the desired manner, such as, for example, by attaching the composite component to a frame assembly or to other composite components.

As shown in FIG. 4, a metallic layer 123 may be disposed within various portions of the composite structure, including, for example, within a portion of the upwardly extending lip portion 124. In one particular embodiment, the metallic layer 123 is a titanium layer, although any other suitable metallic layers may be used. When the attachment apertures 127 are formed, they may be formed through the metallic layer 123. The metallic layer 123 may advantageously serve to distribute the loads introduced through the attachment apertures 127 by a subsequently-installed fastener (e.g. a rivet). For example, in some applications, a rivet may be installed in such a way that the rivet radially-expands outwardly against the attachment apertures 127, which may tend to apply undesirable loads on portions of the surrounding composite portions 114, 118. Such loads may damage (e.g. crush) the reinforcing fibers within the composite portions 114, 118, particularly for graphite fibers. Thus, the metallic layer 123 may advantageously enhance the distribution of loads, and prevent damage that would otherwise occur.

It will be appreciated that once the cured composite component is removed (or demolded) from the forming tool, is may distort from its ideal or desired shape, particularly if it includes an asymmetric composite portion. The cured composite component may be coupled to a frame assembly or to other components using temporary fastening devices in a temporary position, or it may be coupled more permanently to the frame assembly or to other components using more permanent fastening devices. Because the drilling of the attachment apertures or other manufacturing operations have been performed on the cured composite component while it is held in the desired shape within the forming tool, the attachment apertures or other manufacturing operations may be more precisely located or performed in comparison with prior art methods and systems. Accordingly, the time, labor, and expense associated with manufacturing and assembly of the composite component, particularly asymmetric composite components, may be greatly reduced.

Embodiments of apparatus and methods in accordance with the present invention may provide significant advantages over the prior art. For example, because the manufacturing operation is performed on the cured composite component prior to removal of the cured composite component from the forming tool, the manufacturing operation may be accomplished with much greater accuracy in comparison with the prior art. More specifically, in one embodiment, because the reference apertures 208 are formed within the forming tool 200, the corresponding attachment apertures 127 may be drilled into the composite component more easily and with greater precision in comparison with prior art methods. This may be particularly true for asymmetric composite components, which may undesirably distort or warp upon removal of the cured composite component from the forming tool. Thus, because the manufacturing operations can be more easily and accurately performed on the cured composite component prior to its removal from the forming tool, upon such removal, the composite component may be better suited for its intended purpose (e.g. such as attachment to a frame assembly or to other components) in comparison with prior art components. Furthermore, the time and expense associated with performing manufacturing operations on cured composite components (e.g. drilling attachment apertures in asymmetric composite components) may be greatly reduced.

Figure 8:
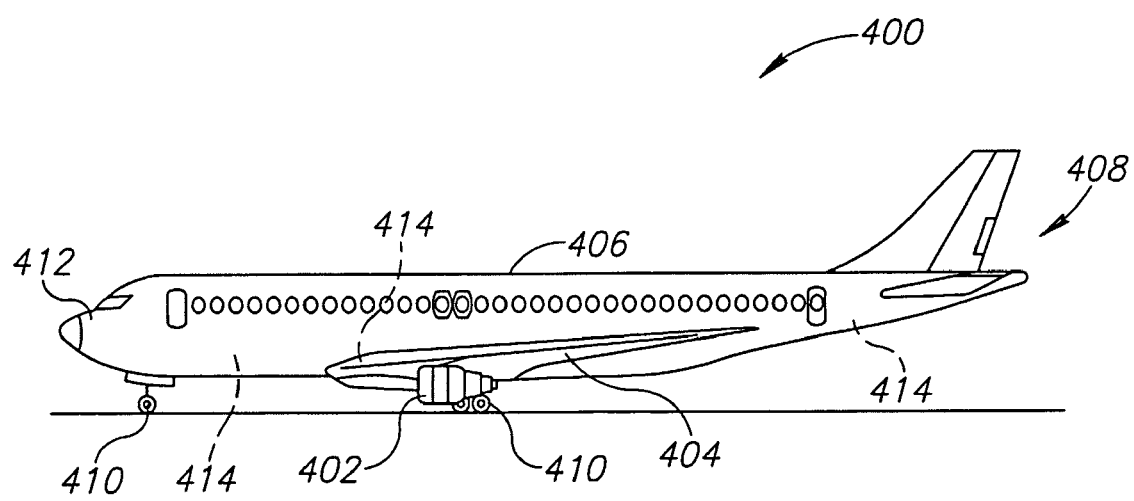
FIG. 8 is a side elevational view of an aircraft in accordance with yet another embodiment of the invention.

It will be appreciated that a wide variety of apparatus may be conceived that include composite components formed in accordance with embodiments of the present invention, and that the invention is not limited to the particular embodiments described above and shown in FIGS. 1-7. For example, FIG. 8 is a side elevational view of an aircraft 400 having one or more composite components 414 formed in accordance with alternate embodiments of the present invention. The aircraft 400 generally includes a variety of components and subsystems generally known in the pertinent art, and which, in the interest of brevity, will not be described in detail. For example, the aircraft 400 includes one or more propulsion units 402 that are coupled to wing assemblies 404, or alternately, may be coupled to a fuselage 406 or even other portions of the aircraft 400. Additionally, the aircraft 400 includes a tail assembly 408 and a landing assembly 410 coupled to the fuselage 406, and a flight control system 412 (not shown in FIG. 4), as well as a plurality of other electrical and mechanical systems and subsystems that cooperatively perform a variety of tasks necessary for the operation of the aircraft 400. The aircraft 400 also includes one or more composite components 414 formed in accordance with the present invention, including, for example, portions of the fuselage 406, the wing assembly 404, the tail assembly 408, within the passenger cabin or the crew cabin (not visible), or in any other desired portion of the aircraft 400.

The aircraft 400 shown in FIG. 4 is generally representative of a commercial passenger aircraft, including, for example, the 737, 747, 757, 767 and 777 commercial passenger aircraft available from The Boeing Company of Chicago, Ill. In alternate embodiments, however, embodiments of the invention may be incorporated into flight vehicles of other types. Examples of such flight vehicles include other commercial aircraft, manned or unmanned military aircraft, rotary wing aircraft, or types of flight vehicles, as illustrated more fully in various descriptive volumes, such as Jane's All The World's Aircraft, available from Jane's Information Group, Ltd. of Coulsdon, Surrey, UK.

Finally, it may also be appreciated that alternate embodiments of apparatus and methods in accordance with the present invention may be utilized in the manufacture of a wide variety of composite components used on other types of vehicles and assemblies. For example, composite components formed in accordance with the present invention may be used in manufacture of boats, automobiles, canoes, surfboards, recreational vehicles, and any other suitable device or assembly that includes composite components.

While embodiments of the invention have been illustrated and described above, many changes can be made without departing from the spirit and scope of the invention. Accordingly, the scope of the invention is not limited by the disclosure of these embodiments. Instead, the invention should be determined entirely by reference to the claims that follow.

What is claimed is:

1. A method comprising forming a composite component using an assembly including a forming tool having a plurality of apertures for drilling fastener holes in the composite component after curing on the tool but before the cured composite component is removed from the tool, the assembly further including a metallic layer insertable in the uncured composite component for supporting fasteners that are subsequently installed in the drilled holes,
    the method including:
    laying out the composite component while uncured on the forming tool and the metallic layer in the uncured composite component;
    curing the composite component;
    using the apertures in the forming tool to drill fastener holes into the cured composite component; and
    removing the drilled composite component from the forming tool.

2. The method of claim 1, wherein the uncured composite component is asymmetric.

3. The method of claim 1, further comprising inserting fasteners into the drilled holes and the metallic layer after the drilled component has been removed from the tool, the metallic layer distributing fastener load and preventing composite material from being crushed.

4. The method of claim 1, wherein a bead of resinous material is formed along an interface between a base portion and a retaining portion of the forming tool.

5. The method of claim 4, wherein removing the cured composite component from the forming tool includes disengaging the cured composite component from the bead of resinous material.

6. The method of claim 1, wherein curing the composite component includes applying at least one of an elevated temperature and an elevated pressure to the composite component.

7. A method of manufacturing an aircraft, comprising forming a composite aircraft component of the aircraft using an assembly including a forming tool having a plurality of apertures for drilling fastener holes in the composite component after curing on the tool but before the cured composite component is removed from the tool, the assembly further including a metallic layer insertable in the uncured composite component for supporting fasteners that are subsequently installed in the drilled holes, the method including:
    forming an uncured composite component on the forming tool with the metallic layer inserted in the composite component;
    curing the composite component;
    using the apertures in the forming tool to drill fastener holes into the cured component while the cured component is still on the forming tool;
    removing the cured composite component from the forming tool; and
    inserting fasteners into the drilled holes to fasten the composite aircraft component to at least one of a frame assembly and a second component.

8. The method of claim 7, wherein forming an uncured composite component on the forming tool includes forming an asymmetric composite component on the forming tool.

9. The method of claim 7, wherein a bead of resinous material is formed along an interface between a base portion and a retaining portion of the forming tool.

10. The method of claim 9, wherein removing the cured composite component from the forming tool includes disengaging the cured composite component from the bead of resinous material.

* * * * *